United States Patent
Ulanskas et al.

(10) Patent No.: US 6,532,277 B2
(45) Date of Patent: *Mar. 11, 2003

(54) METHOD FOR CONTROLLING DSL TRANSMISSION POWER

(75) Inventors: A. John Ulanskas, Littleton, CO (US); Darwei Kung, Denver, CO (US)

(73) Assignee: Qwest Communications International Inc., Denver, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,939

(22) Filed: Nov. 12, 1999

(65) Prior Publication Data

US 2002/0041657 A1 Apr. 11, 2002

(51) Int. Cl.[7] ................ H04M 1/24; H04M 3/08; H04M 3/22

(52) U.S. Cl. .............. 379/27.01; 379/1.04; 379/24; 379/27.03; 379/27.08; 379/1.03

(58) Field of Search ................ 379/1, 23, 24, 379/27, 28, 29, 30, 32, 93.08, 414, 417, 1.01, 1.04, 22, 22.02, 22.03, 22.04, 27.01, 27.02, 27.03, 27.08, 29.01, 29.03, 32.01

(56) References Cited

U.S. PATENT DOCUMENTS

| | | | | |
|---|---|---|---|---|
| 4,625,077 A | * | 11/1986 | Biffle et al. ............... | 379/28 |
| 4,924,492 A | * | 5/1990 | Gitlin et al. ............... | 379/93 |
| 5,063,563 A | * | 11/1991 | Ikeda et al. ............... | 379/1 |
| 5,128,619 A | * | 7/1992 | Bjork et al. ............... | 379/6 |
| 5,768,684 A | * | 6/1998 | Grubb et al. ............. | 455/13.4 |
| 5,815,798 A | * | 9/1998 | Bhagalia et al. .......... | 455/13.4 |
| 5,864,602 A | * | 1/1999 | Needle ..................... | 379/6 |
| 6,055,297 A | * | 4/2000 | Terry ....................... | 379/1 |
| 6,061,427 A | * | 5/2000 | Ryoo ....................... | 379/1 |
| 6,084,946 A | * | 7/2000 | Beierle .................... | 379/30 |
| 6,226,356 B1 | * | 5/2001 | Brown ..................... | 379/24 |
| 6,229,855 B1 | * | 5/2001 | Takatori et al. ........... | 375/296 |
| 6,236,714 B1 | * | 5/2001 | Zheng et al. .............. | 379/6 |
| 6,292,539 B1 | * | 9/2001 | Eichen et al. ............. | 379/1.04 |

FOREIGN PATENT DOCUMENTS

WO    WO-99/14921    * 3/1999    ............ H04M/3/30

* cited by examiner

*Primary Examiner*—Curtis Kuntz
*Assistant Examiner*—Quoc Tran
(74) *Attorney, Agent, or Firm*—Townsend and Townsend and Crew LLP

(57) ABSTRACT

A method for controlling transmission power from a customer premise equipment device over a local loop of a digital subscriber line involves determinating a maximum power level for transmissions over the local loop. The maximum power level is based on a response of the local loop to a test signal to allow a different loop in the binder group to have a different maximum power level to reduce potential for crosstalk in the binder group.

5 Claims, 3 Drawing Sheets

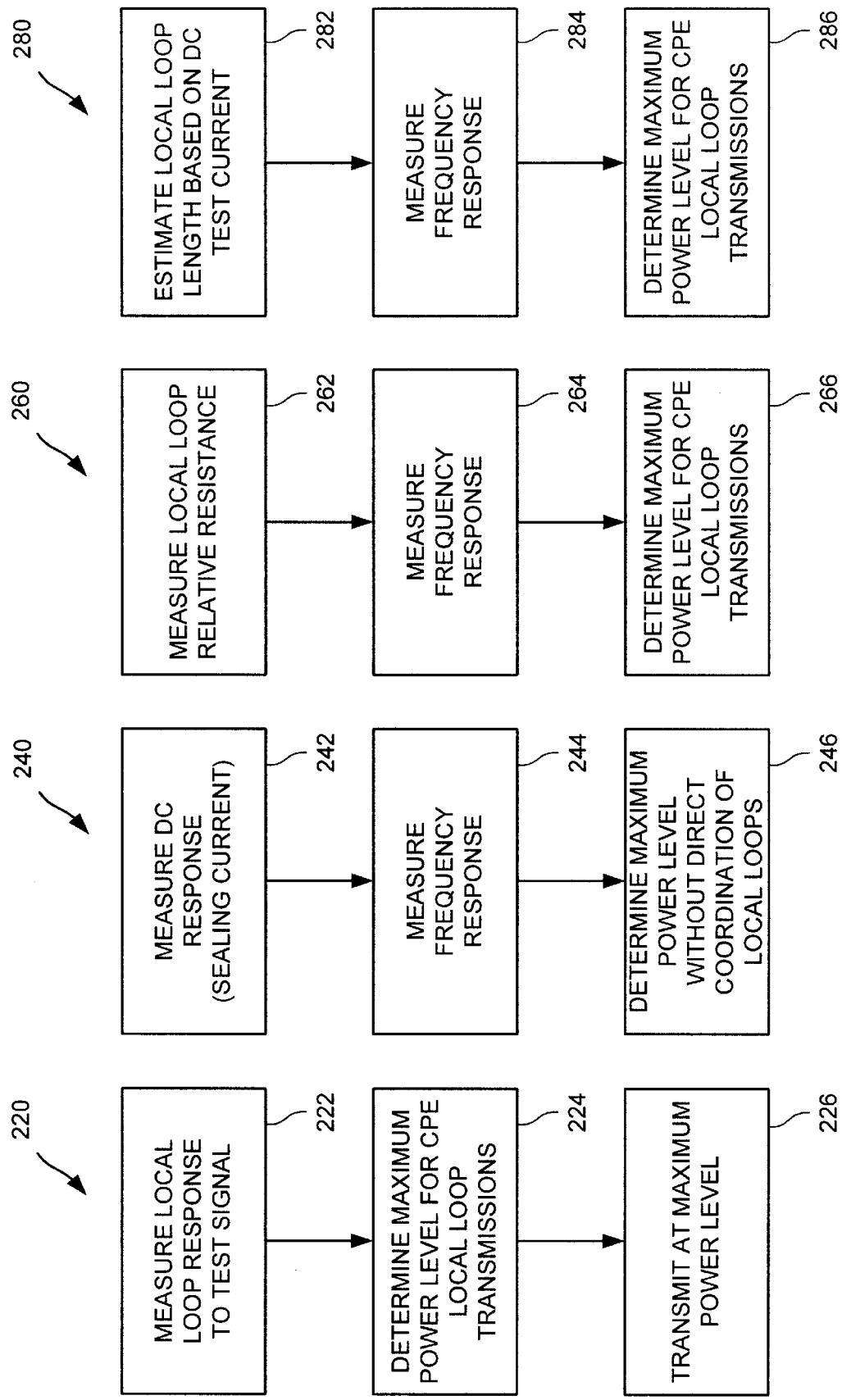

METHOD FOR CONTROLLING DSL TRANSMISSION POWER

TECHNICAL FIELD

The present invention relates to a method for controlling transmission power from a customer premise equipment device over a local loop of a digital subscriber line.

BACKGROUND ART xDSL is a generic term for digital subscriber line equipment and services, including packet-based architectures, such as ADSL, HDSL, SDSL, VDSL, and RADSL. That is, x is the generic. xDSL technologies provide extremely high bandwidth over embedded twisted pair, copper cable plant. xDSL technologies offer great potential for bandwidth-intensive applications, such as Internet access, remote LAN access, video conferencing, and video-on-demand.

ADSL or asymmetric digital subscriber line services generally use existing unshielded twisted pair (UTP) copper wires from the telephone company's central office to the subscriber's premise, utilize electronic equipment in the form of ADSL modems at both the central office and the subscriber's premise, send high-speed digital signals up and down those copper wires, and send more information one way than the other. The ADSL flavor of xDSL services is capable of providing a downstream bandwidth of about 1.5 Mbps–8 Mbps, and an upstream bandwidth of about 16 Kbps–64 Kbps with loop distances ranging from about 3.7 km–5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive digital subscriber line services. RADSL provides a dynamic connection that adapts to the length and quality of the line.

In the xDSL family of services, many xDSL themes, including ADSL, HDSL, SDSL, VDSL, and RADSL, utilize a packet-based approach that does away with the line-grabbing practice of circuit switched networks, such as ISDN (although ISDN service is a form of digital subscriber line). This packet-based approach is very advantageous in a variety of situations, such as high-speed data services, including high definition television or HDTV transmissions.

Of course, xDSL services, also commonly referred to as simply DSL or digital subscriber line services, are much more dependent on line conditions than traditional telephone services. Traditional telephone services typically use a bandwidth including frequencies up to about 3 kilohertz, while the DSL services utilize a bandwidth including frequencies up into the hundreds of kilohertz. While some local loops are in great condition for implementing DSL services, that is, the local loops have short to moderate lengths with minimal bridged taps and splices, many local loops are not as clean. For example, local loop length vary widely, for example, from as short as a few hundred meters to as long as several kilometers.

Further, sometimes the wire gauge for a local loop is not continuous over the length of the loop. That is, a portion of the local loop may be one wire gauge, while an adjacent portion of the local loop has a different wire gauge, with the two portions being spliced together. Still further, many existing local loops have one or more bridged taps. A bridged tap is a length of wire pair that is connected to a loop at one end and is unterminated at the other end. Sometimes, an existing local loop will have several bridged taps so that the telephone company may connect a customer to any one of the taps (while leaving the other taps unterminated). Tapped lines may allow the telephone company to better utilize its copper cable plant distribution. For example, a particular service area may include 25 residences. Because not all residences require multiple phone lines, there may be a total of about 30 or 35 local loops, with some of the loops having multiple bridged taps. As such, it may be possible for any one of the residences to order multiple line service, so long as only a few of the residences do so.

However, because DSL services have a strong dependence on line condition, splices and bridged taps may affect DSL services. If the line conditions are not excessively poor (loop length is not excessively long, while splices and taps are relatively minimal) increasing power for the DSL transmissions may be sufficient to provide adequate DSL services over the loop. It is to be appreciated that, however, simply increased transmission power alone does not always produce successful results.

In addition to loop lengths, number of splices, and number of bridged taps, there are other factors that are involved in providing a successful DSL solution. In addition to the conditions of the local loop itself affecting DSL implementation, crosstalk between local loops may also impair DSL service. For example, the central office side of a local loop is usually bundled into a binder group with other local loops. A binder group typically includes from as few as twenty-five pairs to as many as several hundred pairs. That is, a large number of pairs (loops) are bundled together into a binder group at the central office (or at a digital subscriber line access multiplexer or DSLAM, or at any other distribution point). As the binder group is routed away from the central distribution point, such as the central office, the loops branch out, with loops and small groups of loops departing from the binder group, until eventually, all of the loops are separated, similar to the way that a tree trunk branches out into smaller and smaller branches. On the customer end of the loop, DSL transmissions are sent from the end of the loop toward the central office (or DSLAM, or other distribution point). As the transmission travels toward the distribution end of the loop, the loop becomes bundled together with other loops. When the loops are bundled together, there is potential for crosstalk between different services of the same bundle or binder group. Accordingly, although increasing transmission power may sometimes reduce the effect the splices and bridged taps have on transmissions from the customer premise, the increased transmission power results in increased potential for crosstalk that may affect other loops when the transmission reaches the bundled loops.

Because a power control scheme is needed to assure that DSL transmissions are not underpowered and incapable of overcoming splices and bridged taps, an existing customer premise equipment device is capable of stepping up transmission power in the presence of excessive background noise (or back off when noise decreases). However, in an environment where each DSL service is introduced to a binder group one service at a time, the conventional scheme of measuring wideband frequency response and adjusting transmission power accordingly tends to create a so called race condition. In a race condition, the background noise causes each DSL service in a binder group to constantly boost transmission power a little bit at time. Eventually, all pairs will transmit at a fixed maximum power level. With all loop transmissions being fixed at the maximum power level, the effectiveness of the transmission power back-off functions are nullified. Further, because loop length and conditions vary widely, the race condition results in crosstalk from the better quality loops excessively interfering with the poorer quality loops.

For the foregoing reasons, there is a need for an improved DSL transmission power control method that overcomes the disadvantageous potential for crosstalk between different services in the same binder group that is associated with the race condition present in conventional power control techniques.

DISCLOSURE OF INVENTION

It is, therefore, an object of the present invention to provide a method for controlling transmission power from a customer premise equipment device over a local loop of a digital subscriber line that allows different loops in the same binder group to have different maximum power levels to reduce potential for crosstalk in the binder group.

In carrying out the above object, a method for controlling transmission power from a customer premise equipment device over a local loop of a digital subscriber line wherein a portion of the local loop is bundled with at least one other loop in a binder group is provided. The method comprises measuring a response of the local loop to a test signal, and determining a maximum power level for transmissions over the local loop from the customer premise equipment device. The maximum power level is based on the response so as to allow a different loop in the binder group to have a different maximum power level to reduce potential for crosstalk in the binder group when loops are brought together.

In a preferred embodiment, the method further comprises transmitting over the local loop with the customer premise equipment device generally at the maximum transmitting power level. Alternatively, the method further comprises determining a desired transmitting power level that is not more than the maximum transmitting power level, and transmitting over the local loop with the customer premise equipment device at the desired transmitting power level.

In one embodiment, measuring the response further comprises measuring a direct current response of the local loop to a direct current test signal. A suitable direct current test signal is a sealing current (also known as wetting current) that is applied to a loop for the purpose of preventing transmission degradation due to the oxidation of wire splices. Of course, the sealing current may be continuous or periodically applied. Preferably, measuring further comprises measuring a frequency response of the local loop to a frequency test pattern signal. The frequency test pattern signal is preferably constructed to allow detection of a bridged tap in the local loop. Further, the frequency test pattern signal is preferably constructed to allow detection of a loaded loop. A loaded loop is a loop that is loaded with an inductance to increase low frequency gain, at the expense of high frequency gain, to improve quality of traditional telephone service, but making DSL implementation a bit more difficult.

In one implementation, the local loop has a first end at the customer premise equipment device and a second end at a provider equipment device. Measuring the response and determining the maximum power level will occur at the customer premise equipment device at the local loop such that maximum power levels among different loops in the same binder group are not directly coordinated. Advantageously, each customer premise equipment device may draw conclusions about the conditions of its local loop, and determine a maximum power level accordingly. Although the maximum power levels among the different local loops are not directly coordinated, using the same maximum power level determination technique at each customer premise equipment device effectively reduces crosstalk potential when the loops are bundled together. In the alternative, determinating the maximum power level may occur at the provider equipment end of the local loop to allow coordination of maximum power levels among different local loops in the same binder group. In this alternative embodiment, maximum power levels for the different local loops are directly dependent on each other to provide even more certainty that the potential for crosstalk is substantially minimized among local loops in the same binder group.

Further, in carrying out the present invention, a method for controlling transmission power from a customer premise equipment device over a local loop of a digital subscriber line comprises measuring a relative resistance of the local loop. The method further comprises determining a maximum power level for transmission over the local loop from the customer premise equipment device based on the relative resistance. Preferably, the method further comprises measuring a frequency response of the local loop to a frequency test pattern, and the maximum power level is further based on the frequency response.

Still further, in carrying out the present invention, the method for controlling transmission power from a customer premise equipment device over a local loop of a digital subscriber line comprises estimating the loop length by measuring a response of the local loop to an essentially direct current test signal. Although a direct current test signal is preferred, it is appreciated that any test signal having a sufficiently low frequency to avoid frequency response characteristics associated with unterminated line ends may be sufficient for estimating loop length. The method further comprises determining a maximum power level for transmissions over the local loop from the customer premise equipment device based on the estimated loop length.

In one embodiment, the test signal is a sealing current. Preferably, the method further comprises measuring a frequency response of the local loop to a frequency test pattern, and the maximum power level is further based on the frequency response.

Even further, in carrying out the present invention, a customer premise equipment device for a local loop of a digital subscriber line is provided. The customer premise equipment device comprises a transmission unit including a transceiver, a detector, and control logic. The detector measures a response indicative of a relative resistance of the local loop. The control logic is configured to process the response and determine a maximum power level for transmissions over the loop from the transceiver.

The advantages associated with embodiments of the present invention are numerous. For example, embodiments of the present invention determine a maximum power level for transmissions over the local loop in such a way that potential for crosstalk among loops of the same binder group is substantially reduced. The maximum power levels for the local loops may be coordinated with each other, or (preferably) may be not directly coordinated but preferably based on the same rules so that potential for crosstalk is substantially reduced. In one embodiment, the maximum power level for. transmissions over the local loop is based on the measured response of the local loop to a test signal. In a particular implementation, the maximum power level is based on a measured relative resistance of the local loop (relative to resistance of the other loops). Further, in another embodiment, loop length is estimated by measuring a response of the local loop to an essentially direct current test signal, and the maximum power level is based on the estimated loop length.

Advantageously, although different techniques may be utilized to estimate line conditions, such as loop length, and the presence of splices or taps, embodiments of the present invention determine a maximum power level for transmission over a local loop in such a way that different local loops have different corresponding maximum transmission power levels such that potential for crosstalk when the loops are bundled together in the binder group is substantially reduced. Particularly, because the different local loops may extend over different lengths and conditions prior to reaching the binder group, signal noise such as attenuation and distortion may vary from loop to loop where each loop meets the other at the binder group. As such, in accordance with the present invention, setting a maximum power level for transmissions from the customer premise equipment device may compensate for varying line conditions reducing crosstalk potential because the different loops have appropriate maximum power levels to result in signals having similar or compatible power levels alongside each other in a binder group.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a block diagram illustrating a method of the present invention;

FIG. 4 is a block diagram illustrating another method of the present invention;

FIG. 5 is a block diagram illustrating yet another method of the present invention; and FIG. 6 is a block diagram illustrating still another method of the present invention.

BEST MODE FOR CARRYING OUT THE INVENTION

Figure 1:
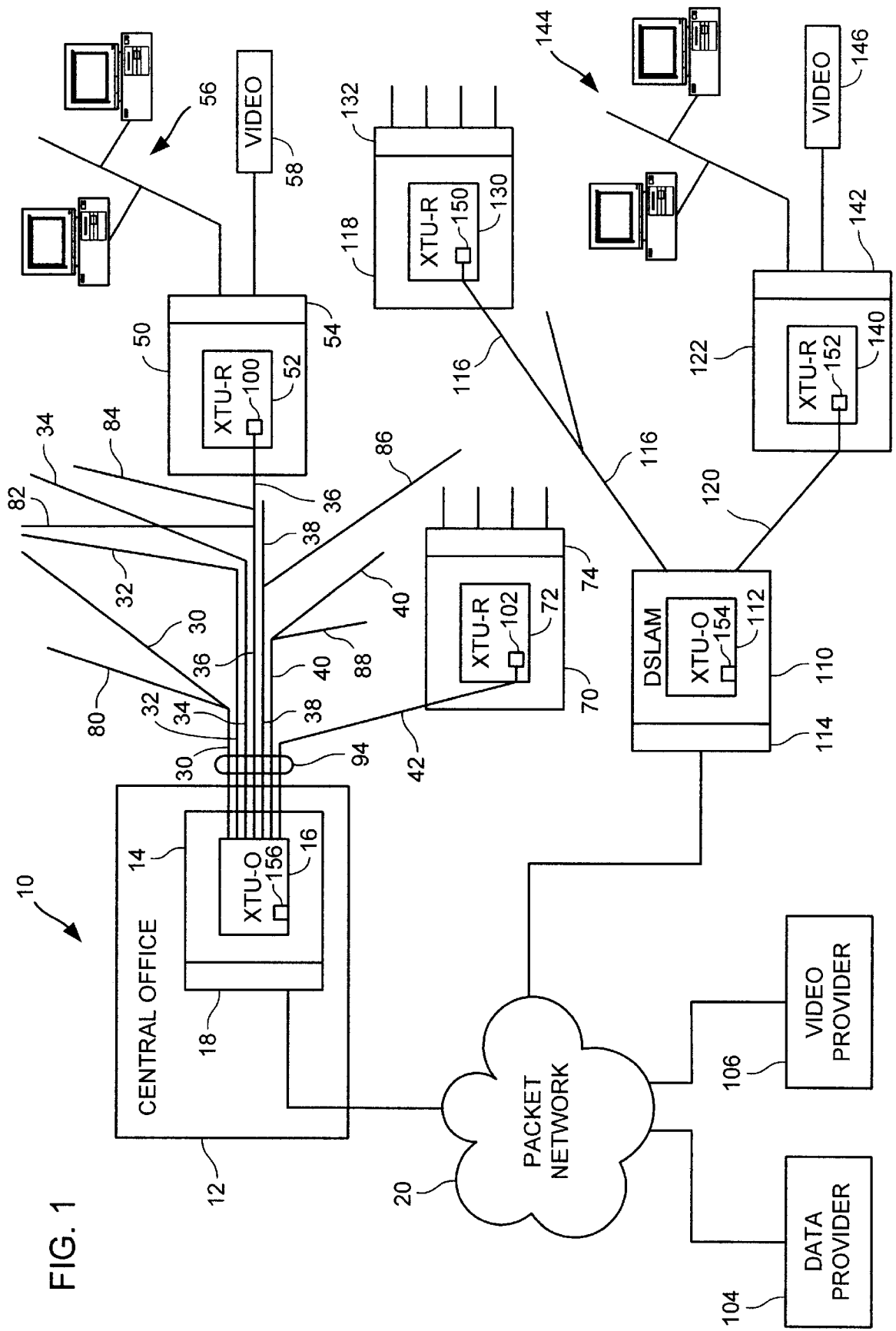
FIG. 1 is a system of the present invention for controlling transmission power from a customer premise equipment device over a local loop of a digital subscriber line.

Referring to FIG. 1, a system of the present invention is generally indicated at 10. System 10, as shown, includes a central office 12. Central office 12 includes a central office terminal 14. A transmission unit 16, shown as an optical transmission unit, is located within central office terminal 14. Further, central office terminal 14 includes an adaption layer 18. Adaption layer 18 provides timing, bandwidth and service management, and flow control mechanisms to adapt the digital subscriber line (DSL) services into packets for packet network 20.

Packet network 20 may take many forms including an asynchronous transfer mode (ATM) network or an Internet Protocol (IP) network. Preferably, packet network 20 is an ATM network, which is a cell type packet network. As such, adaption layer 18 adapts the digital subscriber line packets into ATM streams.

A plurality of digital subscriber lines 30, 32, 34, 36, 38, 40, 42 extend from transmission unit 16 off central office terminal 14. It is to be appreciated that digital subscriber lines leaving the central office are bundled together in large groups called binder groups. Although one such binder group is shown for simplicity, it is appreciated that a number of binder groups may extend from the central office in different directions. The binder group extends from central office terminal 14, and branches out into smaller and smaller groups until individual local loops reach end customers. That is, the branching of the digital subscriber lines is similar to the branching of a tree, with a large group (the tree trunk) extending from the central office terminal and branching out into smaller and smaller branches as the loops extend further and further from central office terminal 14.

In the example illustrated, digital subscriber line 36 connects central office terminal 14 to remote terminal 50. Remote terminal 50 includes a remote transmission unit 52 and has an adaption layer 54. Adaption layer 54 functions to adapt the digital subscriber line 36 to, for example, a computer network 56, and video devices 58. Further, digital subscriber line 42 connects to remote terminal 70. Remote terminal 70 has a transmission unit 72 and an adaption layer 74. As mentioned previously, many of the digital subscriber lines extending from the central office have different line conditions. For example, some of the digital subscriber lines may include different gauges of wire spliced together, while others consist of a single wire gauge extending over the entire loop. Further, some of the loops may have bridged taps, while others may be straight, untapped, loops. The wire gauge splicing, although having only minor effects on traditional telephone service, may need attention when implementing DSL service. Similarly, bridged taps may require attention when implementing DSL services although such bridge taps may be ignored for low bandwidth traditional telephone services.

Examples of bridged taps are shown in FIG. 1. In the example illustrated, digital subscriber line 30 has a bridged tap 80. Digital subscriber line 32 is untapped. Digital subscriber line 34 is also untapped. Digital subscriber line 36 has two bridged taps 82 and 84. Digital subscriber line 38 has a bridged tap 86. Digital subscriber line 40 has a bridged tap 88. And, subscriber line 42 is untapped.

Because different local loops meet up with the binder group at different places, with local loops traveling different distances to reach the same point in the binder group, with the different local loops further having different line conditions such as splices and bridged taps, effective noise including distribution and attenuation between the first transmission unit and a point along the binder group and a second transmission unit and that same point along the binder group may be quite different. For example, as illustrated in FIG. 1, when local loops 30, 32, 34, 36, 38, 40, 42 come together at position 94 of the binder group, signal noise on each local loop due in part to attenuation and distortion originating between point 94 and its transmission unit differs from loop to loop.

For example, local loop 42 is a relatively short loop extending directly from remote terminal 70 to point 94 along the binder group, without any splices or bridged taps. On the other hand, local loop 36 extends from remote terminal 50, along a relatively longer local loop length, possibly passing through splices connecting different wire gauges, extending past bridged taps 82 and 84, to eventually meet up at point 94 of the binder group, with local loop 42. As such, the signal on local loop 42 may only be slightly attenuated as it passes remote terminal 70 to point 94 of the binder group. On the other hand, the signal on local loop 36 may be much more severely attenuated and distorted due to splices and bridged taps in addition to the much longer loop length. That is, terminal unit 50 faces a much noisier communication path than terminal unit 70 to reach point 94.

In a traditional power control scheme, transmission unit 52 and transmission unit 72 would create a race condition, causing each unit to constantly boost transmission power a little bit at a time. Eventually, both transmission unit 52 and transmission unit 72 will transmit at maximum power level, which in a conventional system, is the same for each transmission unit. Because transmission unit 72 is connected to a much higher quality loop, at portion 94 of the binder group, there is much more signal power on loop 42 than on loop 36. Resulting crosstalk from loop 42 introduces even more noise to an already noisy, distorted and attenuated signal on loop 36.

Embodiments of the present invention address this problem, and advantageously determine a maximum power level for transmissions over a local loop from the customer premise equipment device to allow different loops in the binder group to have different maximum power levels to reduce potential for crosstalk in the binder group. In accordance with the present invention, a maximum transmission power level would be determined as a higher level for transmission unit 52 and a relatively lower level for transmission unit 72. As such, in an ideal implementation, the signal power on loop 42 and the signal power on loop 36 would be much closer to each other than in the prior art. By adjusting maximum transmission power to lower the maximum power level for transmission unit 72 relative to unit 52 reduces the potential for crosstalk at portion 94 of the binder group. Further, in the example, it is appreciated that different loops of the binder group may have different maximum power levels between the maximum power levels for transmission units 52 and 72 such that at point 94 of the binder group, each loop has generally close signal power to reduce crosstalk potential.

Factors that would tend to raise the maximum power level for a particular transmission unit are a relatively long loop length, the presence of splices, and the presence of bridged taps. Factors that would tend to reduce the maximum power level for a particular transmission unit are a relatively shorter loop length, a relatively clean line (minimal splices and minimal bridge taps). That is, in accordance with the present invention, a maximum power level is determined for a transmission unit based on loop conditions, as opposed to simply using a fixed maximum power level for all transmission units. The maximum power level may be determined by the transmission unit itself, with the transmission unit performing a local loop test. On the other hand, some embodiments may coordinate the maximum power levels for the transmission units by allowing the central office (or DSLAM) to have some input as to the maximum power level assigned to the remote units. It is appreciated that the maximum power level for transmissions over the local loop for a particular transmission unit may be determined in a number of different ways, for example, by measuring a response of the local loop to a test signal.

In embodiments of the present invention where the maximum power levels for the transmission units are not directly coordinated with each other (and preferably, are determined according to the same rules), control logic 100 determines the maximum power level for transmissions from remote terminal 50 and control logic 102 determines the maximum power level for transmissions from remote terminal 70. On the other hand, in an embodiment where maximum power levels are coordinated with each other, control logic 156 at terminal 14 may play a role or completely determine the maximum power levels for the different remote terminals.

In one approach to determining the maximum power level for a particular local loop, the maximum power level is based on the response of the local loop to a test signal. The test signal may be a direct current test signal such that the measured response is a direct current response for the local loop. Advantageously, direct current response indicates a relative resistance of the local loop, and the direct current test signal may be a sealing current. It is appreciated that although the direct current response (or an essentially direct current response such as a low frequency response that covers sufficiently low frequencies to indicate some information as to the resistance of the local loop and its length), may be supplemented with the frequency response of the local loop to a frequency test pattern. That is, the basic test may give some indication of the loop length, but an enhanced test may advantageously allow detection of a bridged tap or an inductive load on the local loop.

Of course, embodiments of the present invention are not limited to any particular type of local loop testing, but hold advantages in the fact that a maximum power level is assigned to a local loop based on loop conditions. In enhanced embodiments, the loop conditions that are measured may be advanced enough to estimate loop length (preferably by measuring relative resistance) and further may detect bridged taps and loading.

With continuing to FIG. 1, although embodiments of the present invention have been described above with respect to digital subscriber lines extending from central office 12 to the end customer, it is appreciated that the digital subscriber line may extend from more local places to allow for more variety in the DSL implementations. For example, a digital subscriber line access multiplexer (DSLAM) 110 is used to extend the reach of the DSL services, and facilitate implementation of high bit rate services such as VDSL. A carrier connects DSLAM 110 to a central office via packet network 20. As shown, DSLAM 110 includes a transmission unit 112, and an adaption layer 114.

Digital subscriber line 116 serves remote terminal 118, and digital subscriber line 120 serves remote terminal 122. As shown, remote terminal 118 includes a transmission unit 130 and an adaptation layer 132. Further, terminal unit 122 includes a transmission unit 140 and an adaption layer 142. Adaption 142 manages different services to allow connections to a computer network 144 or video devices 146, similar to adaption layer 54 of remote terminal 50. Data and video services may be provided from sources connected to packet network 20 such as data provider 104 and video provider 106.

Figure 2:
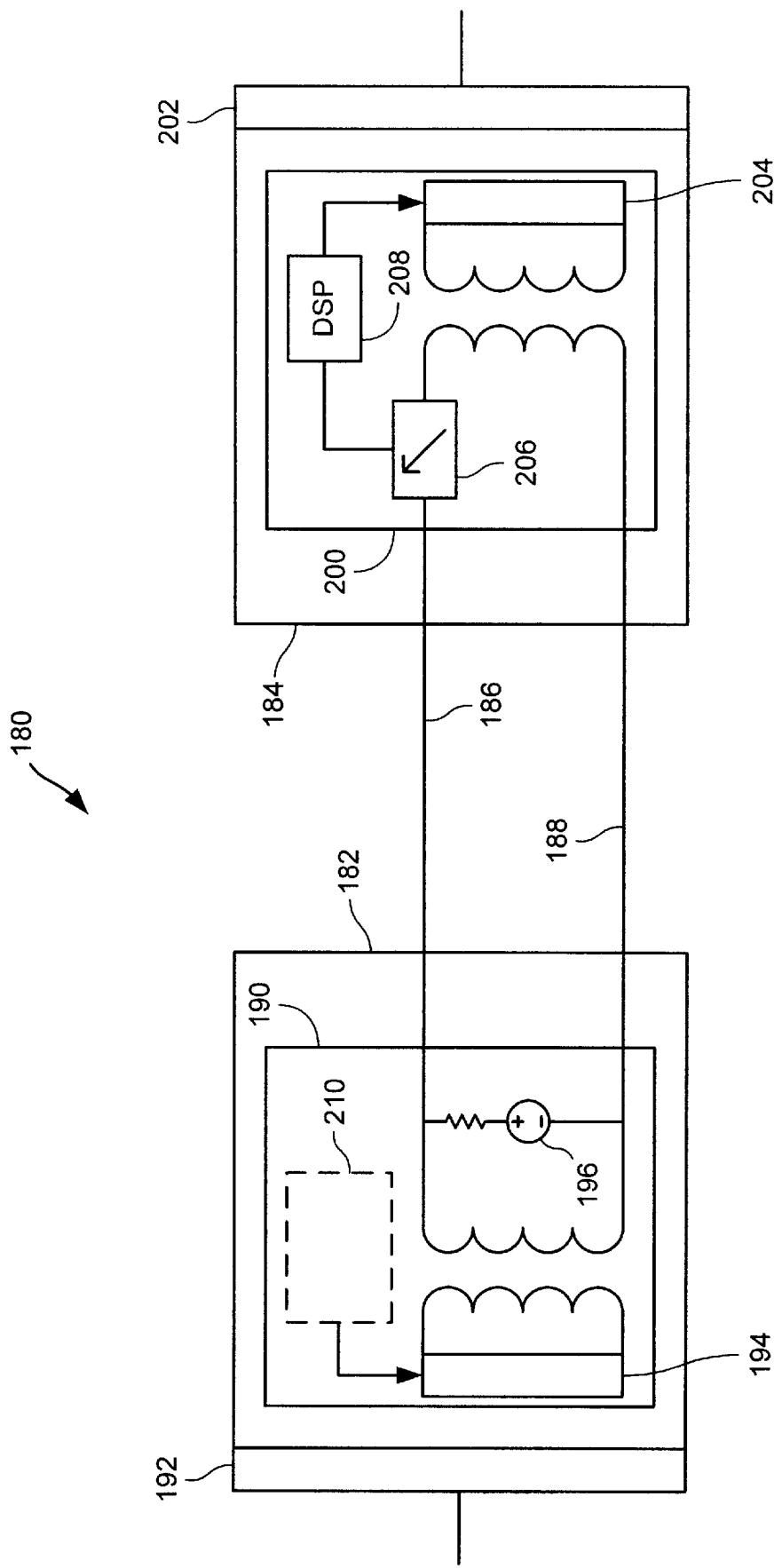
FIG. 2 illustrates a digital subscriber line, server terminal, and remote terminal, showing transmission power control at the customer premise equipment device end of the local loop.

With reference to FIG. 2, an exemplary implementation of the present invention is generally indicated at 180. Provider terminal 182 is connected to remote terminal 184 via a local loop. The local loop is a pair of conductors 186 and 188. Terminal 182 includes a transmission unit 190 and an adaptation layer 192. A transceiver 194 sends and receives information over the local loop. Remote terminal 184 includes a transmission unit 200 and an adaptation layer 202. A transceiver 204 sends and receives information over the local loop. In accordance with the present invention, transceiver 204 transmits over the local loop, and is limited to a maximum power level based on local loop conditions. This maximum power level is determined such that different local loops that meet up with local loop 186, 188 (in a binder group between terminals 182 and 184, the binder group not being specifically shown) have a transmission power relative to the transmission power of unit 200 so as to reduce the effects of crosstalk within the binder group. Of course, it is appreciated that the maximum power level may be determined in a variety of ways for a particular customer premise equipment device, such as loop length estimation by measuring relative resistance or more complex techniques involving DC response in addition to high frequency response.

In one suitable implementation, a sealing current is provided by source 196, and may be measured at the remote terminal to estimate relative resistance and loop length. Loop length estimations may be supplemented by frequency response to more accurately determine an appropriate maximum power level for the transmission unit. In the embodiment illustrated, a detector 206 detects the sealing current (or other test current that preferably includes an essentially DC component). Control logic 208 determines maximum power level and limits transmissions from transceiver 204 accordingly. Of course, in the alternative, control logic 210 on the provider end may determine or assist in a determination of the maximum power level. It is preferred that the control logic be located at the remote terminal in some embodiments of the present invention so that the provider end does not know extensive information about the different local loops, but instead each CPE device at the end of a local loop controls its own maximum power level so that although not directly coordinated with each other, the CPE devices as a group limit transmission power so that potential for crosstalk among local loops coming together in the same binder group is substantially reduced.

It is to be appreciated that FIG. 2 is an exemplary implementation, and that variations are possible. In the example, sealing current measurement at the remote terminal may be compared to a reference current to estimate the loop length. Loop conditions may be better estimated by supplementing this information with various frequency responses to frequency test patterns sent from the central office (or DSLAM) to the remote terminal. In enhanced embodiments, the system may detect bridged taps or other conditions on the local loop in addition to resistance. Advantageously, the transmitting power level over the local loop may be set and locked at the maximum level without any further adjustment, with each CPE device at each local loop limiting its power as appropriate.

With reference to FIG. 3, a method of the present invention is generally indicated at 220. At block 222, the local loop response to a test signal is measured. At block 224, a maximum power level for local loop transmissions is determined based on the response. At block 226, transmissions from the CPE device are to the maximum power level.

As best shown in FIG. 4, a preferred embodiment of the present invention measures the direct current response of the local loop at block 242. The direct current may be a sealing current, if present. At block 244, a frequency response of the local loop is measured to allow detection of bridged taps, splices, and other conditions on the local loop that are not essentially resistance based in nature. At block 246, a maximum power level is determined at each CPE device without coordination among the different local loops. By advantageously using the same rule set at each CPE device, maximum power levels for the different local loops are determined in a way such that crosstalk among local loops in the same binder group is substantially reduced, even though there is not any direct coordination of the local loops. On the other hand, embodiments of the present invention may utilize control logic on the provider end that determines maximum power levels taking into consideration conditions of the different local loops in a dependent fashion.

With reference to FIG. 5, another method of the present invention is generally indicated at 260. At block 262, local loop relative resistance is measured. At block 264, frequency response is measured. At block 266, a maximum power level for CPE local loop transmissions is determined. As mentioned previously, different steps may be taken to determine the maximum power levels for CPE local loop transmissions, one possible technique being to consider local loop relative resistance.

As best shown in FIG. 6, yet another method of the present invention is generally indicated 280. At block 282, local loop length is estimated based on an essentially direct current test. At block 284, frequency response is preferably measured to better provide an indication of the loop length and quality. At block 286, a maximum power level for CPE local loop transmissions is determined.

In accordance with the present invention, various responses may be measured, and various tests may be conducted, to provide an indication of the loop length and quality, including noise generation, and signal attenuation and distortion characteristics of the local loop. Advantageously, the present invention involves determining a maximum power level for transmissions over the loop from the CPE device to allow a different loop in the same binder group to have a different maximum power level to reduce potential for crosstalk in the binder group when the loops come together in the binder group. The maximum power level may be determined in a number of different ways, such as based on relative resistance measurement with a direct current test.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling transmission power from customer premises equipment to provider equipment over a local loop of a digital subscriber line, wherein a portion of the local loop is bundled with at least one other loop in a binder group, the method comprising:

measuring at the customer premises equipment a direct current response of the local loop to a direct current test signal, wherein the response is indicative of a length of the loop and wherein the direct current test signal is a sealing current;

determining at the customer premises equipment a maximum power level for transmissions over the local loop from the customer premises equipment based on the response so as to allow a different loop in the binder group having a different length to have a different maximum power level, the maximum power levels among different local loops not being directly coordinated by the customer premises equipment with each other, but the customer premises equipment using the same technique to determine maximum power level, in order to reduce potential for crosstalk in the binder group; and limiting the power transmission from the customer premises equipment to the maximum power level determined at that customer premises equipment.

2. A method for controlling transmission power from customer premises equipment to provider equipment over a local loop of a digital subscriber line, wherein a portion of the local loop is bundled with at least one other loop in a binder group, the method comprising:

measuring at the customer premises equipment a response of the local loop to a test signal, wherein the response is indicative of a length of the loop;

further measuring a frequency response of the local loop to a frequency test pattern signal;

determining at the customer premises equipment a maximum power level for transmissions over the local loop from the customer premises equipment based on the response so as to allow a different loop in the binder group having a different length to have a different maximum power level, the maximum power levels among different local loops not being directly coordinated by the customer premises equipment with each other, but the customer premises equipment using the same technique to determine maximum power level, in order to reduce potential for crosstalk in the binder group; and limiting the power transmission from the customer premises equipment to the maximum power level determined at that customer premises equipment.

3. The method of claim 2 wherein the frequency test pattern signal is constructed to allow detection of a bridged tap.

4. The method of claim 2 wherein the frequency test pattern signal is constructed to allow detection of a loaded loop.

5. A method for controlling transmission power from customer premises equipment to provider equipment over a local loop of a digital subscriber line, wherein a portion of the local loop is bundled with at least one other loop in a binder group, the method comprising:

measuring at the customer premises equipment a response of the local loop to a test signal, wherein the response is indicative of a length of the loop;

determining at the customer premises equipment a maximum power level for transmissions over the local loop from the customer premises equipment based on the response so as to allow a different loop in the binder group having a different length to have a different maximum power level, the maximum power levels among different local loops not being directly coordinated by the customer premises equipment with each other, but the customer premises equipment using the same technique to determine maximum power level, in order to reduce potential for crosstalk in the binder group;

determining at the provider equipment a maximum power level for transmissions over the local loop from the customer premises equipment, so that the provider equipment may coordinate maximum power level for all local loops in the same binder group and thereby have input as to the maximum power levels for transmissions from the customer premises equipment; and limiting the power transmission from the customer premises equipment to the maximum power level determined at that customer premises equipment.

* * * * *